(12) United States Patent
Liu

(10) Patent No.: US 8,615,620 B2
(45) Date of Patent: Dec. 24, 2013

(54) WIRELESS INTERNET ACCESS DEVICE, SD CONTROL CHIP, AND METHOD FOR DATA COMMUNICATION

(75) Inventor: Haibo Liu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 192 days.

(21) Appl. No.: 13/170,940

(22) Filed: Jun. 28, 2011

(65) Prior Publication Data

US 2011/0320668 A1 Dec. 29, 2011

(30) Foreign Application Priority Data

Jun. 28, 2010 (CN) .......................... 2010 1 0216474

(51) Int. Cl.
*H05K 7/10* (2006.01)
*G06F 13/40* (2006.01)

(52) U.S. Cl.
CPC .................................. *G06F 13/409* (2013.01)
USPC .............................. 710/301; 710/74; 710/314

(58) Field of Classification Search
USPC ........... 710/300–315, 8–19, 104–110, 62–64, 710/72–74
See application file for complete search history.

(56) References Cited

U.S. PATENT DOCUMENTS

| 2002/0174337 | A1 | 11/2002 | Aihara | |
| 2005/0144385 | A1* | 6/2005 | Mowery et al. | 711/115 |
| 2006/0190617 | A1 | 8/2006 | Jung | |
| 2008/0077722 | A1* | 3/2008 | Tang et al. | 710/260 |
| 2008/0146150 | A1* | 6/2008 | Luo et al. | 455/41.2 |
| 2009/0086657 | A1* | 4/2009 | Alpert et al. | 370/310 |
| 2009/0182919 | A1 | 7/2009 | Chang et al. | |
| 2010/0011128 | A1* | 1/2010 | Paycher et al. | 710/1 |
| 2011/0158216 | A1* | 6/2011 | Zaks | 370/338 |
| 2011/0158217 | A1* | 6/2011 | Meng | 370/338 |
| 2011/0238880 | A1* | 9/2011 | Hirayama et al. | 710/301 |
| 2011/0271054 | A1 | 11/2011 | Yang et al. | |
| 2011/0314198 | A1* | 12/2011 | Liu et al. | 710/260 |

FOREIGN PATENT DOCUMENTS

| CN | 25772509 Y | 10/2003 |
| CN | 101431828 A | 5/2009 |
| CN | 201259685 Y | 6/2009 |

(Continued)

OTHER PUBLICATIONS

Extended European Search Report issued in corresponding European Patent Application No. 11171686.6, mailed Jul. 27, 2012.

(Continued)

*Primary Examiner* — Raymond Phan
(74) *Attorney, Agent, or Firm* — Brinks Gilson & Lione

(57) ABSTRACT

A wireless Internet access device, a secure digital (SD) control chip, and a data communication method are disclosed. The method includes the following steps: the wireless Internet access device receives an SD command from a terminal device, where the SD command is converted by the terminal device from a command and/or data sent by an upper layer; the wireless Internet access device determines an interface mode according to the SD interface support of the terminal device; the wireless Internet access device executes the SD command according to the interface mode. In embodiments of the present invention, the SD card is integrated with the wireless Internet access function, which reduces the size of the wireless Internet access device and enables the wireless Internet access device to select a proper mode to meet different service requirements of terminal devices according to the SD interface support of different terminal devices.

10 Claims, 6 Drawing Sheets

(56) References Cited

FOREIGN PATENT DOCUMENTS

| | | |
|---|---|---|
| CN | 101478607 A | 7/2009 |
| CN | 201355841 Y | 12/2009 |
| CN | 101657043 A | 2/2010 |
| CN | 101686269 A | 3/2010 |
| CN | 101883446 A | 11/2010 |
| CN | 102014528 A | 4/2011 |
| EP | 1679641 A2 | 7/2006 |
| JP | 2004-213487 | 7/2004 |
| JP | 2006-222963 | 8/2006 |
| WO | WO 2007035275 A2 | 3/2007 |
| WO | WO 2007066285 A2 | 6/2007 |

OTHER PUBLICATIONS

Office Action issued in corresponding Japanese Patent Application No. 2011-142760, mailed Nov. 20, 2012.
Written Opinion of the International Searching Authority issued in corresponding PCT Patent Application No. PCT/CN2011/073309, mailed Jul. 28, 2011.
Written Opinion of the International Searching Authority issued in corresponding PCT Patent Application No. PCT/CN2011/073347, mailed Aug. 4, 2011.
Technical Committee—SD Card Association, "SD Specifications Part 1E SDIO Simplified Specification" Version 2.00, Feb. 8, 2007.
Written Opinion of the International Searching Authority issued in corresponding PCT Patent Application No. PCT/CN2011/073347, mailed Jul. 27, 2011.
International Search Report issued in corresponding PCT Patent Application No. PCT/CN2011/073347, mailed Jul. 27, 2011.
Extended European Search Report issued in corresponding European Patent Application No. 11164111.4, mailed Aug. 16, 2011.
Written Opinion of the International Searching Authority issued in corresponding PCT Patent Application No. PCT/CN2011/073309, mailed Jul. 19, 2011.
International Search Report issued in corresponding PCT Patent Application No. PCT/CN2011/073309, mailed Jul. 19, 2011.
Office Action issued in corresponding Chinese Patent Application No. 201010216474.1, mailed Aug. 3, 2012.

\* cited by examiner

WIRELESS INTERNET ACCESS DEVICE, SD CONTROL CHIP, AND METHOD FOR DATA COMMUNICATION

CROSS-REFERENCE TO RELATED APPLICATION

This application claims priority to Chinese Patent Application No. 201010216474.1, filed on Jun. 28, 2010, which is hereby incorporated by reference in its entirety.

FIELD OF THE INVENTION

The present invention relates to the data communication field, and in particular, to a wireless Internet access device, a secure digital (SD) control chip, and a method for data communication.

BACKGROUND OF THE INVENTION

Wireless Internet access devices are widely applied due to the features of high uplink and downlink rates, simplicity, and convenience. In the prior art, a wireless Internet access device generally has interfaces such as a USB (Universal Serial Bus, USB means a universal serial bus) interface, a Mini PCI-E (Peripheral Component Interconnect-Express, mini Peripheral Component Interconnect-Express) interface, and a PCM-CIA (Personal Computer Memory Card International Association, PC Memory Card International Association) interface.

It can be seen from the prior art that, the wireless Internet access device is large and cannot be inserted in small ultra-thin products, thus failing to meet the development requirements of terminal products.

SUMMARY OF THE INVENTION

Embodiments of the present invention provide a wireless Internet access device, system, and method, to reduce the size of the wireless Internet access device.

In the embodiments of the present invention, a wireless Internet access device includes an SD control chip, a storage unit, a baseband processing unit (BPU), and an SD bus interface.

The SD control chip is connected to the storage unit and the BPU, and is configured to read or write data in the storage unit and/or forward data between a network and a terminal device through the BPU.

The storage unit is configured to store data sent by the terminal device and/or the network under the control of the SD control chip.

The BPU is configured to implement data interaction between the network and the terminal device under the control of the SD control chip.

The SD bus interface is integrated into the wireless Internet access device, and is configured to connect the wireless Internet access device and the terminal device.

A terminal device includes an SD driver and an SD master controller.

The SD driver is configured to: convert upper-layer application information on the terminal device into an SD command, and send the SD command to the SD master controller, or convert data obtained by the SD master controller into application information, and send the application information to an upper-layer unit of the terminal device.

The SD master controller is configured to: receive the SD command, and send the SD command to a wireless Internet access device, or obtain data from the wireless Internet access device, and forward the data to the SD driver; detect the SD interface support of the terminal device; and send the detection result to the wireless Internet access device, so that the wireless Internet access device selects an SD Memory interface mode or a secure digital input and output (SDIO) interface mode to execute the SD command.

An SD control chip includes a processor, an SDIO slave controller, and an SD Memory slave controller.

The processor (Processor) is connected to the SDIO slave controller and the SD Memory slave controller and configured to: control the SDIO slave controller and the SD Memory slave controller, and forward data between the SDIO slave controller and/or the SD Memory slave controller and a network.

The SDIO slave controller is configured to forward data between the network and the terminal device through the processor according to an SDIO protocol.

The SD Memory slave controller is configured to: read data from the storage unit or write the data of the terminal device and/or the network to the storage unit, and forward data between the network and the terminal device through the processor according to an SD Memory protocol.

A wireless Internet access method includes:

receiving, by a wireless Internet access device, an SD command sent by a terminal device, where the SD command is converted by the terminal device from a command and/or data sent by the upper layer;

determining a corresponding interface mode according to the SD interface support of the terminal device; and executing the SD command according to the interface mode.

A power management method for slave units on a wireless Internet access device includes:

when a processor detects that no interactive data is transmitted between a terminal device and a network within a given time, sending, by the processor, an enable-sleep command to the slave units, where the command is used to instruct the slave units to enter a low power state;

after the slave units receive the enable-sleep command sent by the processor, entering, by the slave units, the low power state;

after the processor receives interactive data between the terminal device and the network, sending, by the processor, a wakeup command to the slave units; and after the slave units receive the wakeup command sent by the processor, entering, by the slave units, a working state from the low power state.

In embodiments of the present invention, the SD card is integrated with the wireless Internet access function, which reduces the size of the wireless Internet access device and enables the device to select a proper mode to meet different service requirements of terminal devices according to the SD interface support of different terminal devices.

DETAILED DESCRIPTION OF THE EMBODIMENTS

Currently, most terminals (for example, personal computers and notebooks) support the storage application of an SD card. The SD Memory card is integrated with an SD Memory Slave Controller (SD Memory slave controller) and a large-capacity Flash chip. The SD Memory slave controller is configured to implement the SD Memory protocol and manage the Flash chip. The Flash chip is configured to provide the storage space for the SD Memory card. Some terminals (for example, digital cameras and smart phones) support the application of an SDIO wireless fidelity (SDIO WiFi) card. The SDIO WiFi card is integrated with an SDIO Slave Controller (SDIO slave controller) and a WiFi chip. The SDIO slave controller is configured to implement the SDIO protocol, and forward data between the WiFi chip and the terminal device.

The SD (Secure Digital) card is a storage device based on a semiconductor flash memory and has several advantages such as large capacity, high performance, and high security. Therefore, the SD card is widely applied in portable devices, such as a digital camera, a PDA (Personal Digital Assistant, personal digital assistant), a multimedia player, and a smart portable terminal. The SD card is small, and its general dimension is 24 mm×32 mm×2.1 mm. The SD card in the prior art is used only as a storage medium and is configured to extend the storage space of digital devices. In the technical solution of the present invention, the SD card can provide wireless broadband communication services. In addition, the SDIO (Secure Digital Input and Output, secure digital input and output) interface is an external interface defined based on the SD standard. The SDIO interface is not only used to accommodate memory cards. Terminal devices such as a PDA and notebook that support the SDIO interface may be connected to the global positioning system (GPS) receiver, WiFi (Wireless Fidelity), Bluetooth Adapter (Bluetooth adapter), modem, local area network (LAN) adapter, bar code reader, frequency modulation (FM) radio, television (TV) receiver, and radio frequency (RF) identification reader through the SDIO interface, thus extending the application of the terminal devices.

Figure 1:
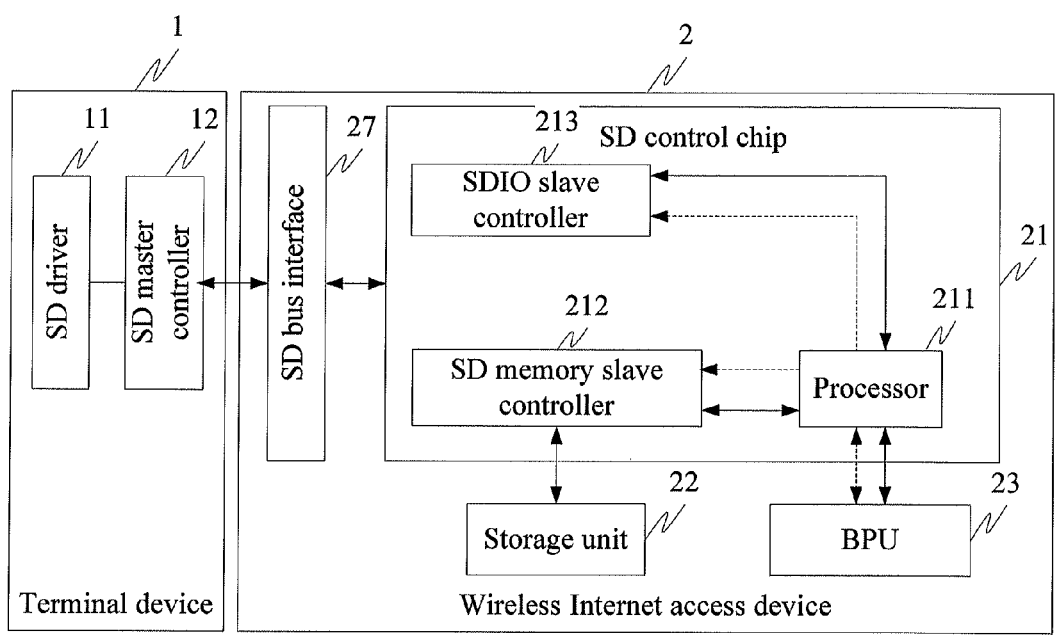
FIG. 1 is a schematic structural diagram of a system according to an embodiment of the present invention.

FIG. 1 illustrates a wireless Internet access system in an embodiment of the present invention. As shown in FIG. 1, the system includes a terminal device 1 and a wireless Internet access device 2.

The terminal device 1 is configured to: receive a command or data sent by the upper layer, convert the command or data into an SD command, and send the SD command to the wireless Internet access device 2.

The wireless Internet access device 2 is integrated or inserted into the terminal device 1, and is configured to select an interface mode according to the SD command to implement functions instructed by the SD command.

The terminal device 1 is connected to the wireless Internet access device 2 through an SD interface. The SD interface is represented by an SD bus. During the specific implementation, the SD bus is integrated into the wireless Internet access device.

Specifically, the terminal device 1 includes an SD driver (SD driver) 11 and an SD master controller 12.

The SD driver 11 is configured to: convert the upper-layer application information on the terminal device into an SD command, and send the SD command to the SD master controller 12, or convert the data obtained by the SD master controller 12 into application information, and send the application information to the upper-layer unit of the terminal device.

The SD master controller 12 is configured to: receive the SD command, and send the SD command to the wireless Internet access device 2, or obtain data from the wireless Internet access device 2, and forward the data to the SD driver 11, and detect the SD interface support of the terminal device.

Specifically, the SD master controller on the terminal device is classified into SD Memory master controller and SDIO master controller. The SDIO master controller supports both the SDIO interface and the SD Memory interface. The SD Memory master controller supports only the SD Memory interface. For different terminal devices, the support of the SD interface is determined according to the type of the master controller on the terminal devices. For example, when the terminal device has the SDIO master controller, it can be determined that the terminal device supports both the SDIO interface and the SD Memory interface. When the terminal device has the SD Memory master controller, it can be determined that the terminal device supports only the SD Memory interface.

The wireless Internet access device selects the SD Memory interface mode or the SDIO interface mode to execute the SD command according to the detected SD interface support of the terminal device.

The wireless Internet access device 2 includes an SD control chip 21, a storage unit 22, a BPU 23, and an SD bus (SD Bus) interface 27.

The SD control chip 21 is connected to the storage unit and the BPU and configured to read or write data in the storage unit, or forward data between the network and the terminal device.

The storage unit 22 is connected to the SD control chip 21 and configured to store the data sent by the terminal device 1 and/or the network under the control of the SD control chip 21.

The BPU 23 is connected to the SD control chip 21 and is configured to implement data interaction between the network and the terminal device 1 under the control of the SD control chip 21.

The SD bus interface 27 is integrated into the wireless Internet access device 2 and configured to connect the wireless Internet access device 2 and the terminal device 1. Specifically, the SD bus interface 27 is configured to connect the SD control chip 21 on the wireless Internet access device 2 and the SD master controller 12 on the terminal device 1.

Preferably, the SD control chip 21 is integrated with a processor (Processor) 211, an SD Memory slave controller (SD Memory Slave Controller) 212, and an SDIO slave controller (SDIO Slave Controller) 213.

The processor (Processor) 211 is connected to the SD Memory slave controller 212 and the SDIO slave controller 213 and configured to: manage and control the SD Memory slave controller 212 and the SDIO slave controller 213, and process and forward data between the SD Memory slave controller 212 or the SDIO slave controller 213 and the BPU 23.

Specifically, the process of managing and controlling the SD Memory slave controller 212 and the SDIO slave controller 213 by the processor 211 includes the following step: The processor 211 configures the SD Memory slave controller 212 and/or the SDIO slave controller 213 according to the detection result of the SD interface support of the terminal device, where the detection is performed by the SD master controller 12 of the terminal device.

The SD Memory slave controller 212 is connected to the storage unit 22 and the processor 211 and is configured to read data from the storage unit 22 or write the data of the terminal 1 and/or the network to the storage unit 22, and is further configured to forward data between the BPU 23 and the terminal device 1 through the processor 211 according to the SD Memory protocol.

The SDIO slave controller 213 is connected to the processor 211 and is configured to forward data between the BPU 23 and the terminal device 1 through the processor 211 according to the SDIO protocol.

The BPU 23 is connected to the SD control chip 21 through the following modes provided by the processor 211: SPI (Serial Peripheral Interface, serial peripheral interface), UART (Universal Asynchronous Receiver/Transmitter, universal asynchronous receiver/transmitter), USB (Universal Serial Bus, universal serial bus), and SRAM (Static Random Access Memory, static random access memory).

Specifically, the storage unit 22 is connected to the SD Memory slave controller 212 and is configured to storage data sent by the terminal device 1 and/or the network under the control of the SD Memory slave controller 212. The BPU 23 is connected to the processor 211 and is configured to implement data interaction between the network and the terminal device 1 under the control of the processor 211.

Figure 2:
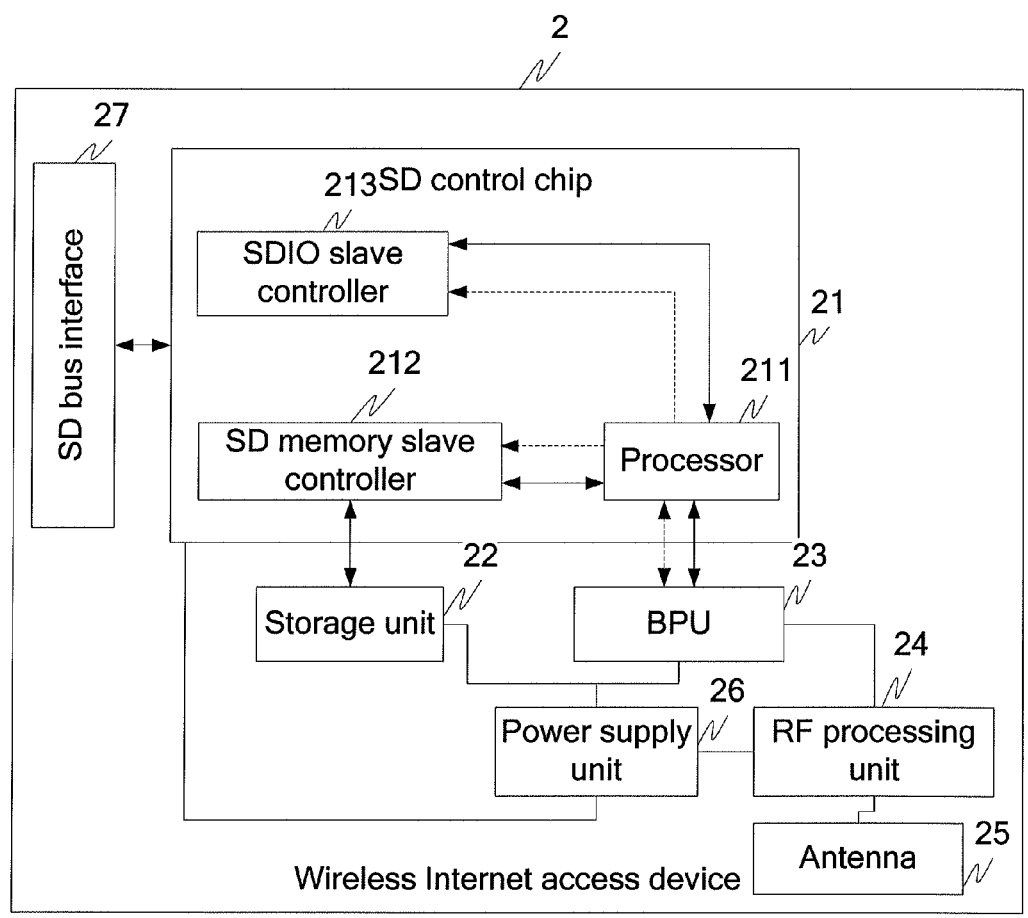
FIG. 2 is a schematic structural diagram of a wireless Internet access device according to an embodiment of the present invention.

In the specific implementation of the embodiment, as shown in FIG. 2, the wireless Internet access device 2 may further include:

an RF processing unit 24, connected to the BPU 23 and configured to: receive data sent by the BPU 23, modulate the data into an RF signal, and send the RF signal to an antenna 25, or demodulate the RF signal received by the antenna 25 into a baseband signal, and send the baseband signal to the BPU 23;

the antenna 25, configured to: receive and send the RF signal processed by the RF processing unit 24, or receive an RF signal from the network, and send the RF signal to the RF processing unit 24; and a power supply unit 26, configured to supply power for the active working units such as the SD control chip 21, the storage unit 22, the BPU 23, and the RF processing unit 24.

In the implementation of the device provided in the embodiment, the wireless Internet access device 2 may further include other modules, such as a subscriber identity module (SIM, Subscriber Identity Module) (which is not shown in FIG. 2). Other modules are not limited in the embodiment of the present invention.

In the implementation of the device provided in the embodiment, the wireless Internet access device may be integrated or inserted into the terminal device. By using the wireless Internet access device, the terminal device not only can store data in the storage unit on the wireless Internet access device but also can implement wireless communication with the network.

Figure 3:
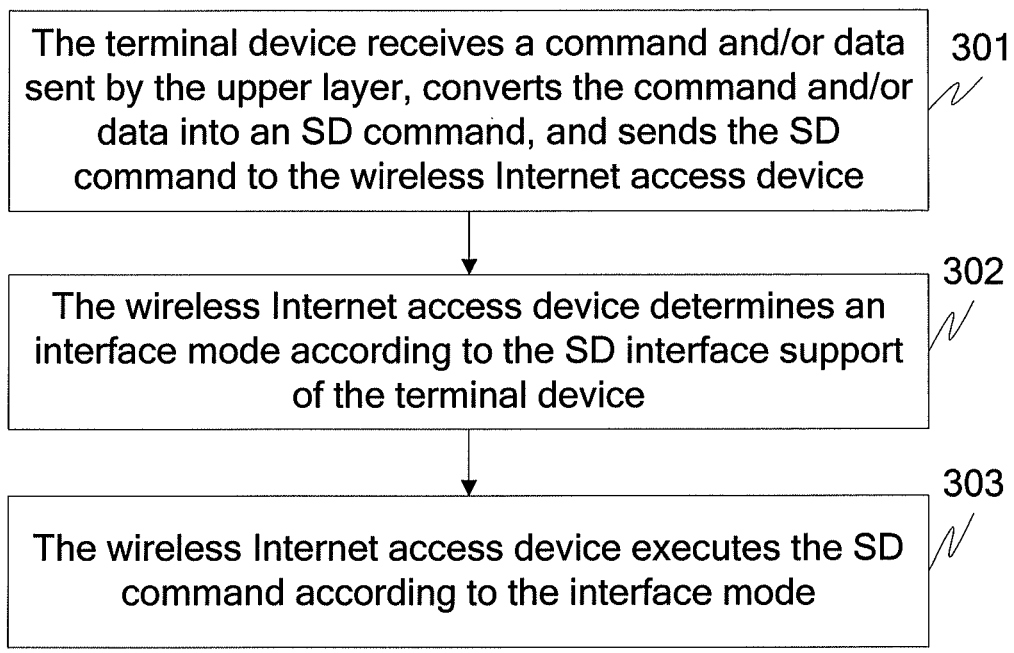
FIG. 3 is a schematic flowchart showing a first embodiment of the present invention.

FIG. 3 is a flowchart showing a wireless Internet access method according to an embodiment of the present invention. The method includes the following steps:

Step 301: The wireless Internet access device receives an SD command from a terminal device, where the SD command is converted by the terminal device from the command and/or data sent by the upper layer.

The wireless Internet access device is integrated or inserted into the terminal device, and the interface may be an SD bus interface.

Specifically, before step 301, as shown in FIG. 1, the SD master controller on the terminal device detects the SD interface support of the terminal device in advance; after the SD interface support of the terminal device (the SD Memory interface mode and/or the SDIO interface mode) is detected, the processor in the SD control chip sets the SDIO salve controller and the SD Memory slave controller inside the SD control chip according to the detection result. For example, if the terminal device does not support the SDIO interface mode but supports only the SD Memory interface mode, the processor sets the SDIO slave controller in the SD control chip to the inactive state, and the SD master controller disables the SDIO slave controller, and switches the wireless Internet access device to the SD Memory interface mode. Under this circumstance, the SD Memory slave controller is enabled by the processor. Conversely, if the terminal device does not support the SD Memory interface mode but supports only the SDIO interface mode, the processor disables the SD Memory slave controller, and enables the SDIO slave controller. If the terminal device supports both the SDIO interface mode and the SD Memory interface mode, both the SDIO slave controller and the SD Memory slave controller are enabled by the processor. Under this circumstance, two interface modes are available.

Step 302: The wireless Internet access device determines an interface mode according to the SD interface support of the terminal device.

Specifically, according to the SD interface support of the terminal device, the wireless Internet access device selects the SD Memory interface mode or the SDIO interface mode to execute the SD command. Specifically, if the terminal device supports only the SDIO interface, the wireless Internet access device selects the SDIO interface mode; if the terminal device supports only the SD Memory interface mode, the wireless Internet access device selects the SD Memory interface mode; if the terminal device supports both the SDIO interface and the SD Memory interface, the wireless Internet access device selects a proper interface mode according to the current service requirements of the terminal device. For example, when the terminal device needs to communicate with the network, the exemplary mode is the SDIO interface mode; when the terminal device needs to read or write data in the storage unit, the preferred mode is the SD Memory interface mode.

Step 303: The wireless Internet access device executes processing corresponding to the SD command according to the interface mode.

Specifically, the SD bus interface is represented by an SD bus physically. The SD bus may be connected to multiple controllers, such as the SD Memory slave controller and the SDIO slave controller. These controllers may be used individually or jointly. In this way, the wireless Internet access device has multiple interface modes: the SDIO interface mode and/or the SD Memory interface mode.

When the terminal device does not support the SDIO interface mode but supports only the SD Memory interface mode, the SDIO slave controller is set to the inactive state, while the SD Memory slave controller is set to the active state. In this way, the wireless Internet access device works in the SD Memory interface mode; the SD Memory slave controller analyzes the logical address in the SD command, and determines a physical address corresponding to the logical address according to a mapping between the stored logical address and the physical address of the storage unit connected to the SD Memory slave controller. If the SD Memory slave controller can find a physical address corresponding to the logical address according to the mapping, the SD Memory slave controller determines that the SD command is to read data from the storage unit. If the SD Memory slave controller fails to find a physical address corresponding to the logical address according to the mapping, the SD Memory slave controller determines that the SD command is to implement communication between the terminal device and the network through the BPU.

When the terminal device supports the SDIO interface mode, the SDIO slave controller is enabled. After detecting that the SDIO slave controller is in the active state, the processor sets the wireless Internet access device to work in the SDIO interface mode. Under this circumstance, the SD bus interface converts a signaling message and communication data in the SD command into an attention (AT) command and a Point-to-Point Protocol or Internet Protocol (PPP/IP) packet under the control of the SDIO slave controller, sends the AT command or PPP/IP packet to the SDIO slave controller through the virtual serial port of the SD bus interface on the terminal device, and implements communication between the terminal device and the network through the processor, BPU, RF processing unit, and antenna.

By using the method provided in the embodiment, when the wireless Internet access device is integrated or inserted into the terminal device, the size of the wireless Internet access device may be reduced, thus saving the space for the design of terminal products. In addition, a corresponding interface mode may be selected according to the SD interface support of different terminal devices to store data and implement communication between the terminal device and the network. Therefore, the technical solution provided in the embodiment has better universality for different terminals.

Figure 4:
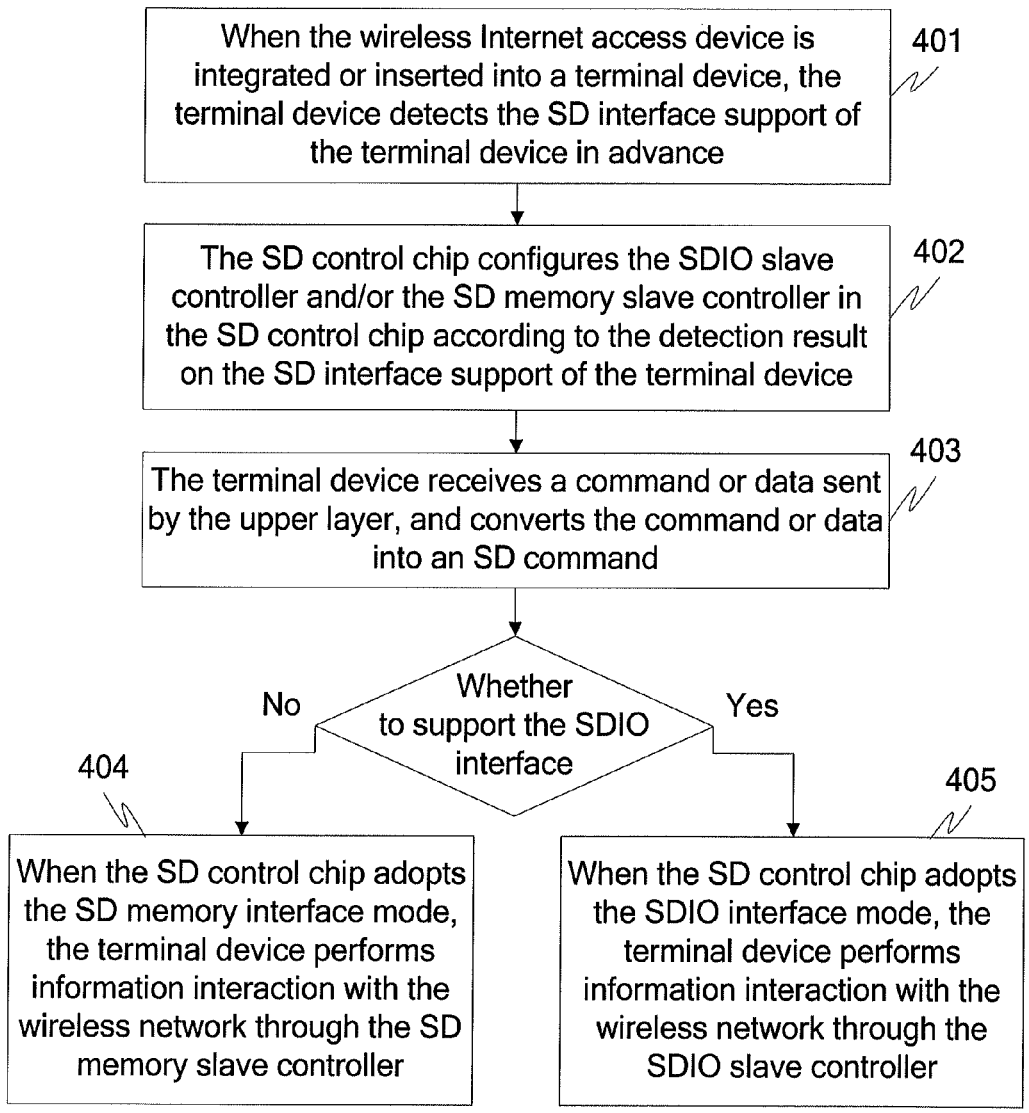
FIG. 4 is a schematic flowchart showing a second embodiment of the present invention.

The following describes the embodiment of this method with reference to specific scenarios. As shown in FIG. 4, the method includes the following steps:

Step 401: When the wireless Internet access device is integrated or built into a terminal device, the terminal device detects the SD interface support of the terminal device in advance.

Specifically, the SD master controller detects the SD interface support of the terminal device in advance according to the SD protocol.

The SD master controller of the terminal device is classified into SD Memory master controller and SDIO master controller. The SDIO master controller may detect the SDIO interface support and the SD Memory interface support. The SD Memory master controller detects only the SD Memory interface support. For different terminal devices, the support of the SD interface is determined according to the type of the master controller. For example, when the terminal device has the SDIO master controller, it can be determined that the terminal device supports both the SDIO interface and the SD Memory interface. When the terminal device has the SD Memory master controller, it can be determined that the terminal device supports only the SD Memory interface.

Step 402: The SD control chip configures the SDIO slave controller and/or the SD Memory slave controller in the SD control chip according to the detection result of the SD interface support of the terminal device.

Specifically, most terminal devices such as a PC (Personal Computer) or a notebook do not support the SDIO interface, but devices such as PDAs, digital cameras, and smart phones support the SDIO interface. The SD control chip on the wireless Internet access device is integrated with the SDIO slave controller and the SD Memory slave controller; the processor selects the SDIO interface mode and the SD Memory interface mode. In this way, the wireless Internet access device can be integrated or inserted into various terminal devices, so that various terminal devices can interact with the wireless network by using the wireless Internet access device.

In the process of configuring the SDIO slave controller and the SD Memory slave controller, an SD driver is loaded according to the type of SD slave controllers (specifically, the SDIO slave controller and the SD Memory slave controller) that needs to be configured. If the SD Memory slave controller is enabled, the SD Memory slave controller searches the terminal device to check whether the corresponding SD driver is available. Generally, the terminal device may load the SD Memory driver automatically. If the SDIO slave controller is enabled, the terminal device loads the SDIO driver; or if both the SD Memory slave controller and the SDIO slave controller are enabled, the terminal device loads both the SDIO driver and the SD Memory driver.

Step 403: The terminal device receives a command or data sent by the upper layer, and converts the command or data into an SD command.

Specifically, if the terminal device does not support the SDIO interface mode, the SDIO slave controller is set to the inactive state, while the SD Memory slave controller is set to the active state. In this way, the wireless Internet access device works in the SD Memory interface mode; the SD Memory slave controller analyzes the logical address in the SD command, and determines a physical address corresponding to the logical address according to a mapping between the stored logical address and the physical address of each unit connected to the SD Memory slave controller. If the SD Memory slave controller can find a physical address corresponding to the logical address according to the mapping, the SD Memory slave controller determines that the SD command is to read data from the storage unit. If the SD Memory slave controller fails to find a physical address corresponding to the logical address according to the mapping, the SD Memory slave controller determines that the SD command is to implement communication between the terminal device and the network through the BPU.

When the terminal device supports the SDIO interface mode, the SDIO slave controller is enabled. After detecting that the SDIO slave controller is in the active state, the processor sets the wireless Internet access device to work in the SDIO interface mode. Under this circumstance, the SD bus interface converts the data (communication data and signaling data) of communication with the network in the SD command into a PPP/IP packet and an AT command under the control of the SDIO slave controller, converts the PPP/IP packet and AT command into serial port data through a serial port driver, and sends the serial port data to the BPU, thus implementing communication between the terminal device and the network.

It should be noted that, in step 401, the wireless Internet access device may identify the interface mode supported by the terminal device when the wireless Internet access device is inserted to the terminal device; or the wireless Internet access device may identify the interface mode supported by the terminal device when the terminal device needs to read or write data or needs to communicate with the network (that is, in the process of executing step 403).

Step 404: When the SD control chip adopts the SD Memory interface mode, the terminal device performs information interaction with the wireless network through the SD Memory slave controller.

Specifically, the terminal device writes the data of communication with the network to a special address (for example, 0×FFFF FFFF) in the SD Memory. When the SD Memory slave controller detects that the written address is a special address, the SD Memory slave controller forwards the data to the processor; the processor forwards the data to the BPU for processing. Similarly, after receiving interactive data from the network, the BPU sends the interactive data to the processor; the processor forwards the interactive data to the SD Memory slave controller; when the terminal device reads the special address in the SD Memory, the interactive data can be obtained.

Step 405: When the SD control chip adopts the SDIO interface mode, the terminal device performs information interaction with the wireless network through the SDIO slave controller.

Specifically, when the SD control chip works in the SDIO interface mode, the information interaction between the terminal device and the wireless network is implemented under the control of the SDIO slave controller. The terminal device writes the interactive data to the No. 1 Function (the SDIO Standard UART, defined in the SDIO protocol) of the SDIO slave controller; the SDIO slave controller forwards the interactive data to the processor; the processor forwards the interactive data to the BPU for processing. Similarly, after receiving the interactive data from the network, the BPU sends the interactive data to the processor; the processor forwards the interactive data to the SDIO slave controller; when the terminal device reads data from the No. 1 Function of the SDIO slave controller, the corresponding interactive data can be obtained.

As shown in FIG. 1, the following describes the signal processes in the SD Memory interface mode and the SDIO interface mode with reference to four specific scenarios.

(1) The terminal device reads or writes data in the storage unit by using the SD Memory interface mode.

When the terminal device supports the SD Memory interface mode and reads or writes data in the storage unit on the wireless Internet access device, the terminal device converts the application information of the terminal device into an SD command by using the SD driver 11, and sends the SD command to the SD master controller; the SD master controller receives the SD command, and sends the SD command to the wireless Internet access device through the SD interface; when the wireless Internet access device determines that the command or data is sent to the storage unit according to the logical address in the SD command, the SD Memory slave controller converts the obtained logical address into a physical address, and reads the data corresponding to the physical address or writes the data to the storage unit corresponding to the physical address. In specific product applications, the wireless Internet access device in the form of an SD card is installed on terminal devices such as notebooks and digital cameras, so that these devices can access the data in the storage unit on the SD wireless Internet access device.

(2) The terminal device communicates with the network by using the SDIO interface mode.

When the terminal device supports the SDIO interface mode and needs to perform the information interaction with the network, the terminal device converts the packet information that the terminal device needs to exchange into an SD command by using the SD driver, and sends the SD command to the SD master controller; the SD master controller receives the SD command, and sends the SD command to the SDIO slave controller in the SD control chip through a virtual serial port of the SDIO interface; the SDIO slave controller parses the SD command to obtain packet data, and sends the packet data to the processor; the processor sends the packet data to the BPU; the BPU sends the packet data to the network through the RF processing unit and the antenna. The process of receiving data from the network side in the SDIO interface mode is reverse to process (2), and is not further described. In specific product applications, the wireless Internet access device in the form of an SD card is installed on terminal devices such as smart phones, digital cameras, and PDAs, so that these terminal devices can communicate with the network through the SD wireless Internet access device.

(3) The terminal device communicates with the network by using the SD Memory interface mode.

When the terminal device supports the SD Memory interface mode and needs to perform information interaction with the network, the terminal device converts the application information of the terminal device into an SD command by using the SD driver, and sends the SD command to the SD master controller; the SD master controller receives the SD command, and sends the SD command to the wireless Internet access device through the SD interface; when the wireless Internet access device determines that the command or data is sent to the BPU according to the logical address in the SD command, the SD Memory slave controller sends the command or data to the application modules of the BPU through the processor; the BPU sends the data to the network through the RF processing unit and the antenna. The process of receiving data from the network in the SD Memory interface mode is reverse to process (3). In specific product applications, the wireless Internet access device in the form of an SD card is installed on terminal devices such as PCs, notebooks, digital cameras, and PDAs, so that these terminal devices can communicate with the network.

(4) The storage unit communicates with the network by using the SD Memory interface mode.

When the terminal device supports the SD Memory interface mode and needs to implement information interaction between the storage unit on the wireless Internet access device and the network, the terminal device converts the application information of the terminal device into an SD command by using the SD driver, and sends the SD command to the SD master controller; the SD master controller receives the SD command, and sends the SD command to the wireless Internet access device through the SD interface; when the wireless Internet access device 2 determines that the network communicates with the storage unit according to the logical address in the SD command, the wireless Internet access device 2 converts the logical address into a physical address according to the SD command under the control of the SD Memory slave controller; the SD Memory slave controller reads data from the storage unit corresponding to the physical address, and sends the data processed by the processor and the BPU to the network. In this way, the data in the storage unit can be uploaded to the network. In another direction, the SD Memory slave controller converts the logical address into a physical address according to the SD command, and writes the data that the BPU obtains from the network to the storage unit corresponding to the physical address, so that the storage unit stores the network data. In a scenario of the embodiment, the terminal device is a digital camera. The SD Internet access device is integrated into or built in the digital camera; under the control of the SD Memory slave controller, the SD Internet access device can upload the data (for example, photos or videos) in the storage unit to the network through the BPU. In this way, the photos or video and audio data in the digital camera can be uploaded to the network server in the SD Memory interface mode, so that the data in the user's blog, micro blog, and social networking sites can be updated in time. In addition, the data on the network may also be downloaded to the storage unit on the wireless Internet access device by using the SD Memory interface mode.

To better manage the power of the SD chip, the processor in the SD control chip enables and disables each controller (in this embodiment, controllers include the SD Memory slave controller, the SDIO slave controller, the storage unit, and the BPU) to reduce the power consumption.

Figure 5:
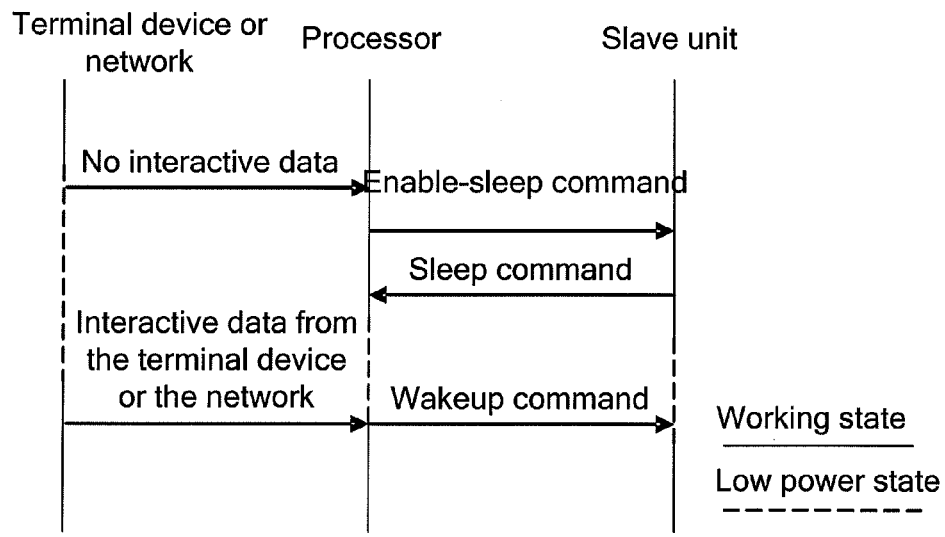
FIG. 5 is a schematic flowchart showing a power management method according to a first embodiment of the present invention.

With reference to FIG. 5 and FIG. 1, the following describes how the processor manages the power of units on the wireless Internet access device. As shown in FIG. 5, three vertical lines indicate the working state of the terminal device or the network, the processor, and the slave units respectively; the interactive data refers to the data exchanged between the terminal device and the network; as shown in FIG. 5, the solid lines refer to the working state, and the dotted lines refer to the low power state. The following describes how the processor manages the power of the slave units on the wireless Internet access device with reference to FIG. 5.

(1) When the processor detects that no interactive data is transmitted between the terminal device and the network within a given time, the processor sends an enable-sleep command to the slave units, instructing the slave units to enter the low power state.

Preferably, the given time in step (1) may be preset by the user, for example, one minute, or may be written by a chip manufacturer during the production of chips.

When the terminal device or the network needs to perform interactive data communication, the processor and the slave units are in the working state.

(2) After receiving the enable-sleep command sent by the processor, the slave units enter the low power state.

Preferably, after receiving the enable-sleep command and before entering the low power state, the slave units send a sleep command to the processor, and then enter the low power state; after receiving the sleep command, the processor enters the low power state automatically.

(3) After receiving the interactive data sent by the terminal device or the network, the processor sends a wakeup command to the slave units.

Preferably, after receiving the interactive data from the terminal device or the network, the processor enters the working state from the low power state, and sends a wakeup command to the slave units.

(4) After receiving the wakeup command sent by the processor, the slave units enter the working state from the low power state.

In actual scenarios, the slave units in the embodiment refer to the SDIO slave controller, the SD Memory slave controller, and the BPU. In a specific control process, the processor may enter the low power state after all the slave units enter the low power state.

To clearly and comprehensively describe the power management process on a slave unit performed by the processor, the following embodiment takes the BPU as an example.

Figure 6:
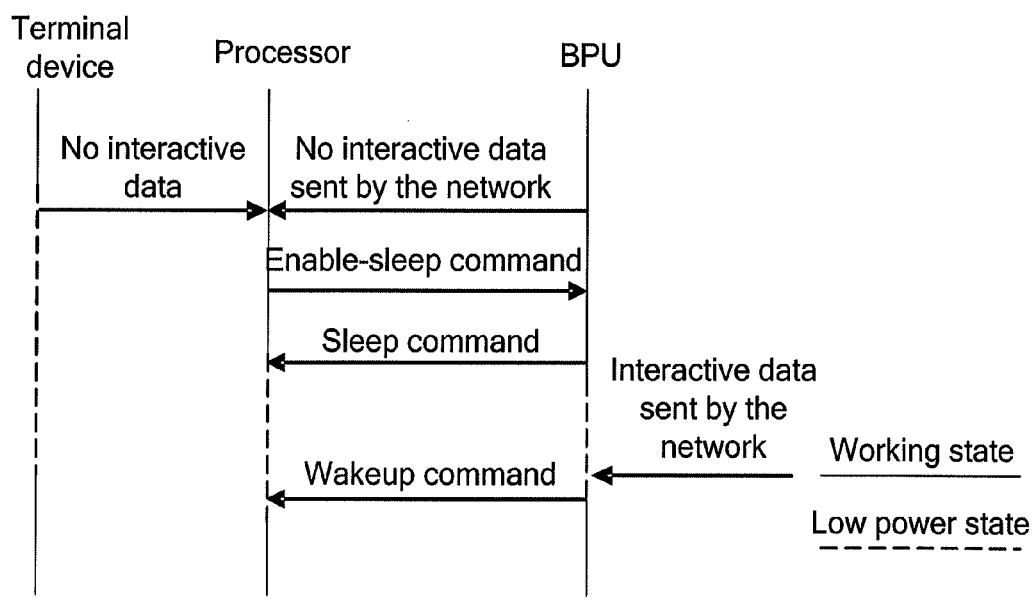
FIG. 6 is a schematic flowchart showing a power management method according to a second embodiment of the present invention.

The following describes the specific power management process with reference to two specific scenarios:

(1) Scenario 1: As shown in FIG. 6, three vertical lines refer to the working state of the terminal device, the processor, and the BPU respectively; the solid lines refer to the working state, and the dotted lines refer to the low power state. The power management process performed by the processor includes the following steps:

When the processor detects that neither the terminal device nor the network has interactive data, the processor sends an enable-sleep command to the BPU.

After receiving the enable-sleep command sent by the processor, the BPU sends a sleep command to the processor and enters the low power state.

After receiving the sleep command, the processor enters the low power state automatically.

After receiving the interactive data sent by the network, the BPU enters the working state from the low power state, and sends a wakeup command to the processor.

After receiving the wakeup command, the processor enters the working state.

Figure 7:
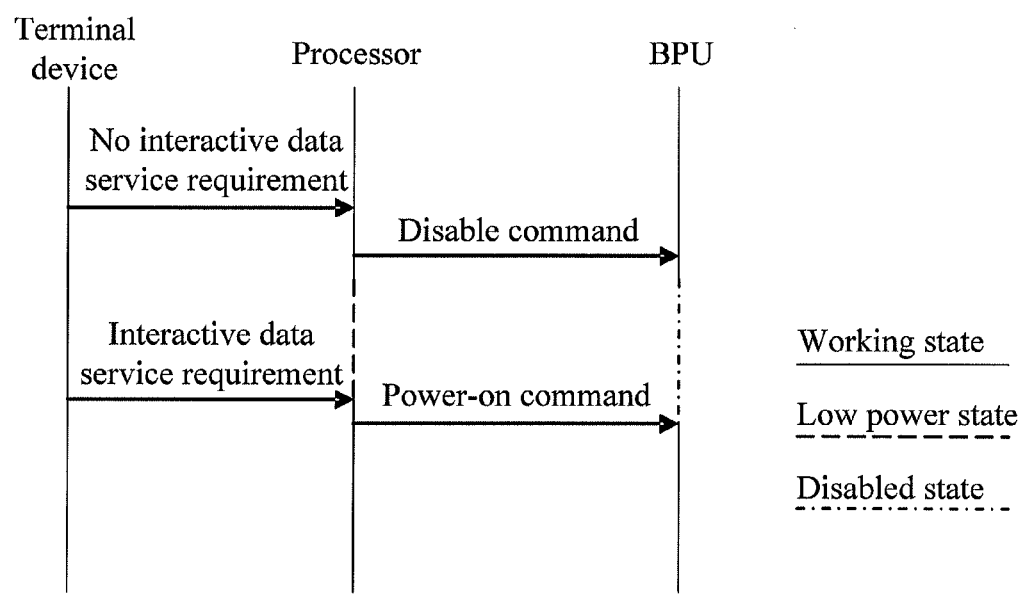
FIG. 7 is a schematic flowchart showing a power management method according to a third embodiment of the present invention.

(2) Scenario 2: As shown in FIG. 7, three vertical lines refer to the working state of the terminal device, the processor, and the BPU respectively; the solid lines refer to the working state, the dotted lines refer to the low power state, and the dash-dotted lines refer to the disabled state. The power management process of the BPU performed by the processor includes the following steps:

When the processor detects that no interactive data is transmitted between the terminal device and the network for a long time (for example, one minute; the time may be set by the user according to the actual requirements when the user uses the wireless Internet access device or may be written by the chip manufacturer in the production process), the processor sends a disable command to the BPU; after receiving the disable command, the BPU is powered off and enters the disabled state; when the terminal device has service requirements for interactive data, the terminal device sends a request to the processor; after receiving the request, the processor sends a power-on command to the BPU; after receiving the power-on command, the BPU is powered on and enters the working state.

It should be noted that the preceding embodiment describes a power management process of the BPU performed by the processor. The processor may manage the power of other units of the SD control chip shown in FIG. 1 (for example, the SDIO slave controller, the SD Memory slave controller, and the storage unit) by using a similar method. To better describe the power management process of the units in the SD control chip or other units on the wireless Internet access device, the following description takes the SDIO slave controller as an example.

When accessing the storage unit on the wireless Internet access device or communicating with the network through the wireless Internet access device, if the terminal device detects that the terminal device does not support the SDIO interface mode, the terminal device sends an enable-sleep command or a disable command to the SDIO slave controller. In this way, the SDIO slave controller enters the low power state or the disabled state to reduce the power consumption.

For the SD Memory slave controller, if the terminal device does not support communication between the terminal device and the network in the SD Memory interface mode, the processor may send an enable-sleep command or a disable command to the SD Memory slave controller, so that the SDIO slave controller enters the low power state or the disabled state to reduce the power consumption. In addition, before entering the low power state or the disabled state, the SD Memory slave controller may send an instruction for entering the low power state and the disabled state to the storage unit, so that the storage unit enters the corresponding state to reduce the power consumption. When the terminal device needs to read or write data in the storage unit by using the SD Memory slave controller, the terminal device sends a wakeup command or a power-on command to the SD Memory slave controller to wake up or power on the SD Memory slave controller, so that the SD Memory slave controller enters the working state. In addition, the SD Memory slave controller sends a wakeup command or a power-on command to the storage unit, so that the storage unit also enters the working state.

It is understandable that the processor can also manage the power of the units that are not directly connected to the processor. As shown in FIG. 2, the wireless Internet access device may further include an RF processing unit. When the processor detects that no interactive data is transmitted between the terminal device and the network, the processor may send a sleep command or a disable command to the RF processing unit through the BPU, so that the RF processing unit enters the low power state or the disabled state to reduce the power consumption.

In addition, in the process of implementing data interaction between the terminal device and the network performed by the BPU, the BPU needs to run a corresponding firmware. The firmware of the BPU may be stored in the following two ways:

(1) The storage unit integrated into the BPU is configured to store the firmware that the BPU needs to run.

(2) The storage unit on the wireless Internet access device is configured to store the firmware of the BPU. When the BPU is powered on, the processor in the SD control chip controls the SD Memory slave controller to read the firmware in the storage unit, and loads the firmware to the BPU, so that the BPU can run the firmware. In this way, the baseband signal processing function is implemented in the process of data interaction between the terminal device and the network.

With the preceding embodiment, the storage unit on the wireless Internet access device can be better used, without any additional storage unit integrated into the BPU, thus simplifying the product structure and reducing the product cost.

In embodiments of the present invention, the SD card is integrated with the wireless Internet access function; the wireless Internet access device sends the command or data to the BPU or the storage unit according to the logical address in the SD command. In this way, the size of the wireless Internet access device is reduced, thus saving the space for the design of terminal products. Terminal devices with the SD interface such as digital cameras, PDAs, and multimedia players may use the wireless Internet access device provided in embodiments of the present invention.

Based on the description of the embodiments of the present invention, it is understandable to those skilled in the art that the present invention may be implemented through software and a necessary universal hardware platform or through hardware only. In most circumstances, the former is preferred. Therefore, the essence of the technical solution of the present invention or the contributions to the prior art may be embodied as a software product. The software product is stored in a readable storage medium (for example, a floppy disk, a hard disk, or a compact disk-read only memory (CD-ROM), and includes several instructions that enable a device to perform the methods provided in the embodiments of the present invention.

The preceding descriptions are merely exemplary embodiments of the present invention, but not intended to limit the protection scope of the present invention. Any modification, variation, or replacement made by those skilled in the art without departing from the technical scope disclosed in the present invention should fall within the protection scope of the present invention. Therefore, the protection scope of the present invention is subject to the appended claims.

What is claimed is:

1. A wireless Internet access device, comprising a secure digital (SD) control chip, a storage unit, a baseband processing unit (BPU), and an SD bus interface, wherein:
   the SD control chip is connected to the storage unit and the BPU, and is configured to at least one of read or write data in the storage unit and forward data between a network and a terminal device through the BPU;
   the storage unit is configured to store the data sent by the terminal device and/or the network under the control of the SD control chip;
   the BPU is configured to implement data interaction between the network and the terminal device under the control of the SD control chip; and
   the SD bus interface is integrated into the wireless Internet access device, and is configured to connect the wireless Internet access device and the terminal device;
   wherein the SD control chip comprises a processor, a secure digital input and output (SDIO) slave controller, and an SD Memory slave controller,
   wherein the processor is connected to the SDIO slave controller and the SD Memory slave controller, and is configured to: control the SDIO slave controller and the SD Memory slave controller, and forward data between the SDIO slave controller and the BPU, or the SD Memory slave controller and the BPU;
   wherein the SDIO slave controller is configured to forward data between the BPU and the terminal device through the processor according to an SDIO protocol; and
   wherein the SD Memory slave controller is configured to:
      read data from the storage unit or write at least one of data of the terminal device and the network to the storage unit, and forward data between the BPU and the terminal device through the processor according to an SD Memory protocol;
      analyze a logical address in a SD command;
      determine a physical address corresponding to the logical address according to a mapping between the logical address and the physical address of the storage unit connected to the SD Memory slave controller,
      if the physical address corresponding to the logical address can be found according to the mapping, determine that the SD command is to read data from the storage unit, or determine that the SD command is to write data to the storage unit;
      if the physical address corresponding to the logical address cannot be found according to the mapping, determine that the SD command is to implement communication between the terminal device and the network through the baseband processing unit (BPU).

2. The wireless Internet access device of claim 1, wherein the SD bus interface under the control of the SDIO slave controller is configured to:
   convert a signaling message and communication data in the SD command into an attention (AT) command and a Point-to-Point Protocol or Internet Protocol (PPP/IP) packet;
   send the AT command and PPP/IP packet to the SDIO slave controller through a virtual serial port of the SD bus interface on the terminal device, and
   implement communication between the terminal device and the network through the processor, the a baseband processing unit (BPU), a radio frequency (RF) processing unit, and an antenna.

3. A secure digital (SD) control chip, comprising a processor, a secure digital input and output (SDIO) slave controller, and an SD Memory slave controller, wherein:

the processor is connected to the SDIO slave controller and the SD Memory slave controller, and is configured to: control the SDIO slave controller and the SD Memory slave controller, and forward data between the SDIO slave controller and a network, or the SD Memory slave controller and a network;

the SDIO slave controller is configured to forward data between the network and a terminal device through the processor according to an SDIO protocol; and the SD Memory slave controller is configured to:

read data from a storage unit or write data of the terminal device and/or the network to the storage unit, and forward data between the network and the terminal device through the processor according to an SD Memory protocol;

analyze a logical address in a SD command;

determine a physical address corresponding to the logical address according to a mapping between the logical address and the physical address of the storage unit connected to the SD Memory slave controller;

if the physical address corresponding to the logical address can be found according to the mapping, determine that the SD command is to read data from the storage unit, or determine that the SD command is to write data to the storage unit;

if the physical address corresponding to the logical address cannot be found according to the mapping, determine that the SD command is to implement communication between the terminal device and the network through the baseband processing unit (BPU).

4. The secure digital control chip of claim 3, wherein the SD bus interface under the control of the SDIO slave controller is configured to:

convert a signaling message and communication data in the SD command into an attention (AT) command and a Point-to-Point Protocol or Internet Protocol (PPP/IP) packet;

send the AT command and PPP/IP packet to the SDIO slave controller through a virtual serial port of the SD bus interface on the terminal device, and implement communication between the terminal device and the network through the processor, the a baseband processing unit (BPU), a radio frequency (RF) processing unit, and an antenna.

5. A wireless Internet access method, comprising:

receiving, by a wireless Internet access device, a secure digital (SD) command from a terminal device, wherein the SD command is converted by the terminal device from at least one of a command and/or data sent by an upper layer;

determining, by the wireless Internet access device, an interface mode according to the SD interface support of the terminal device; and executing, by the wireless Internet access device, the SD command according to the interface mode;

executing, by the wireless Internet access device, the SD command when the terminal device adopts an SD Memory interface mode comprises:

analyzing, by an SD Memory slave controller, a logical address in the SD command, and determining a physical address corresponding to the logical address according to a mapping between the logical address and the physical address of a storage unit connected to the SD Memory slave controller; if the physical address corresponding to the logical address can be found according to the mapping, determining that the SD command is to read data from the storage unit, or determine that the SD command is to write data to the storage unit; if the physical address corresponding to the logical address cannot be found according to the mapping, determining that the SD command is to implement communication between the terminal device and a network through a baseband processing unit (BPU).

6. The method of claim 5, wherein: before the terminal device receives the command and/or data sent by the upper layer, an SD master controller of the terminal device detects the SD interface support of the terminal device in advance, and a processor of an SD control chip configures the status of an SDIO slave controller and an SD Memory slave controller inside the SD control chip according to the detection result.

7. The method of claim 5, wherein the step of executing, by the wireless Internet access device, the SD command when the terminal device adopts a secure digital input and output (SDIO) interface mode comprises:

converting, by an SD bus interface under the control of an SDIO slave controller, a signaling message and communication data in the SD command into an attention (AT) command and a Point-to-Point Protocol or Internet Protocol (PPP/IP) packet, sending the AT command and PPP/IP packet to the SDIO slave controller through a virtual serial port of the SD bus interface on the terminal device, and implementing communication between the terminal device and a network through a processor, the baseband processing unit (BPU), a radio frequency (RF) processing unit, and an antenna.

8. The method of claim 5, wherein the step of determining, by the wireless Internet access device, the interface mode according to the SD interface support of the terminal device comprises:

when the terminal device supports both an SDIO interface and an SD Memory interface, selecting a proper interface mode according to current service requirements of the terminal device.

9. The method of claim 6, wherein the step of configuring the status of the SDIO slave controller and the SD Memory slave controller inside the SD control chip by the processor of the SD control chip according to the detection result comprises: loading a corresponding SD driver according to a type of the SD slave controller that needs to be configured.

10. The method of claim 8, wherein: when the terminal device needs to communicate with a network, an SDIO interface mode is selected; when the terminal device needs to read or write data in a storage unit, an SD Memory interface mode is selected.

* * * * *